Patented Feb. 17, 1948

2,436,286

UNITED STATES PATENT OFFICE 2,436,286

ALKOXY-SUBSTITUTED ESTERS

Richard Ensign Brooks, Wilmington, Del., assignor to E. I. du Pont de Nemours & Company, Wilmington, Del., a corporation of Delaware No Drawing. Application November 9, 1945, Serial No. 627,779

10 Claims. (Cl. 260—484)

This invention relates to a process for the preparation of esters and more particularly to the preparation of alkoxy-substituted esters from ketenes and acetals or ketals.

An object of the present invention is to provide a process for the preparation of new compositions of matter. A further object is to provide new compositions of matter from those having the generic formula $ROCXYCH_2COOR$ in which the R groups are alkyl and the X and Y groups are hydrogen or alkyl. A further object is to provide a process for the interaction of ketenes with symmetrical acetals or ketals whereby alkoxy-substituted esters are produced. Other objects and advantages of the invention will hereinafter appear.

The above and other objects are realized by the action of a ketene on an acetal or a ketal in the presence of an acid catalyst. Generally the reaction takes place spontaneously by the introduction of the ketene into the acidified acetal or ketal, the acetal or ketal being acidified and the ketene bubbled into the acidified reaction mixture in the substantial absence of water.

Generically the reaction may be illustrated by the equation:

(1)
$$ROCXYOR + CX'Y'C=O \rightarrow ROCXYCX'Y'COOR$$

wherein R is an alkyl group such as methyl, ethyl, n- and isopropyl, n- and isobutyl or higher alkyl groups, the aryl groups such as phenyl, tolyl, etc., substituted alkyl and aryl groups such as carbomethoxymethyl, etc., and X, Y, X' and Y' may be hydrogen or alkyl groups similar or dissimilar to the members of the R group. By substituting in the R, X, Y, X' and Y' positions, it will be noted that the formula designates the reaction of ketals or acetals including the formals to produce alkoxy-substituted esters. The mechanism of the reaction appears to involve a splitting of the carbon-oxygen bond shown in the formula ROCXY—OR, and inserting therein the ketene group.

A specific embodiment of one feature of the invention is illustrated by the equation:

(2) $CH_3OCH_2OCH_3 + CH_2=C=O \rightarrow$
$CH_3OCH_2CH_2COOCH_3$ wherein methylal, a symmetrical formal, reacts with ketene to form methyl beta-methoxypropionate.

The reaction is preferably conducted at relatively low temperatures. These temperatures should range below 100° C., preferably between —80° and +10° C., depending on the nature of the catalyst employed. The acetal or ketal is cooled to the prescribed temperature, and ketene vapors are introduced by bubbling, diffusion or any other suitable means.

The catalyst used for conducting the reaction may be any suitable acid catalyst such as sulfuric acid, phosphoric acid, benzene sulfonic acid, zinc chloride, ferric chloride, aluminum chloride, boron trifluoride and its addition products with ethers, esters, and the like, the Friedel-Crafts type catalysts or combinations of these catalysts. The catalyst should be present in amounts ranging from approximately 0.2 to 100% based on the weight of the acetal or ketal present, the proportion of catalyst depending primarily on its activity and on the temperature employed. While the reaction will proceed, in some instances, in the absence of a catalyst, catalysts are preferably used.

The ketenes that may be used include the aldoketenes having the formula $RCH=CO$ in which R is alkyl and the keto-ketenes having the formula $R_2C=CO$ in which R is an alkyl group such as methyl, ethyl, or propyl, or an aryl group such as phenyl or tolyl.

The acetals that may be employed in conducting the reaction include the symmetrical formals such as methylal, diethyl formal, dipropyl formal and the higher molecular weight formals, the unsymmetrical formals such as methyl ethyl formal, methyl propyl formal, ethyl propyl formal, methyl butyl formal and the like as well as similar acetals such as dimethyl acetal, diethyl acetal, methyl ethyl acetal, methyl propyl acetal, ethyl propyl acetal, diallyl isobutyral, and the like. Ketals, such as acetone dimethyl ketal or cyclohexanone-ethylene glycol cyclic ketal, may also be used. Also, cyclic ketals and cyclic acetals or formals or polymers thereof may be used.

When employing symmetrical acetals the introduction of the ketene group gives predominantly a single substituted ester while with the unsymmetrical acetals a mixture of esters usually results because the ketene group is introduced on either side of the carbon attached to the oxygen groups.

The examples illustrate preferred embodiments of the invention in which parts are by weight unless otherwise indicated.

*Example 1.*—Boron fluoride (1.22 M.) was absorbed in 3.39 M. of pure methylal with stirring at ca.—80° C. Then a total of 0.66 M. of ketene, mixed with a similar quantity of inert gases such as carbon monoxide and ethylene, was bubbled into the mixture with vigorous stirring at a temperature of about −80° C., during a period of three hours. Sodium methoxide in methanol was added to the product while it was still cold, until the mixture was slightly basic. The product was distilled rapidly at low temperature and pressure, and then fractionated. After the removal of methylal and methanol, methyl beta-methoxypropionate was distilled at 84°/100 mm. This compound has a refractive index at 25° of 1.3990, is somewhat soluble in water, is soluble in the common organic solvents, and forms a homogeneous azeotrope with water. It was identified by its saponification number (476.0, 480.7 vs. 476 theoretical) and by its methoxyl content after saponification (21.0, 21.7% vs. 26.3% theoretical).

In the process of this example, 73% of the ketene used was converted to methyl beta-methoxypropionate.

Example 2.—Ketene (0.64 M.) was passed during three hours through a mixture of pure methylal (2.25 M.) and concentrated sulfuric acid (0.09 M.) which was maintained at a temperature of 4° C. The product was neutralized, rapidly distilled, and then fractionated as in Example 1. The conversion of ketene to methyl beta-methoxypropionate, B. P. 58°/32 mm., was 21.8%.

Example 3.—Ketene (0.50 M.) was bubbled during 139 minutes through a mixture of 2.25 M. pure methylal and 0.1 M. zinc chloride, at a temperature of 4° C. The product was worked up as in the previous examples. The conversion of ketene to methyl beta-methoxypropionate was 24.5%.

Example 4.—Ketene gas (.41 M.) was passed during fifty-five minutes through a mixture of 17.7 g. of diallyl isobutyral

22.5 g. of anhydrous ether, and 2.7 g. of

The temperature was maintained at 0° C. The product was neutralized with methanolic sodium methoxide and distilled. There was obtained a 5.1 g. fraction boiling at 76–84°/1 mm. which was identified as allyl beta-allyloxy-beta-isopropylpropionate

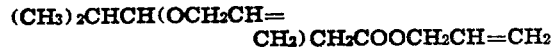

by its saponification number (276 vs. 265 theoretical) and iodine number (225 vs. 239 theoretical). The conversion of the isobutyral to this cut and another slightly lower-boiling cut was 37%.

The alkoxy-substituted esters of this invention are valuable solvents and plasticizers for use in the plastic arts as well as valuable intermediates for the preparation of other organic compounds.

I claim:

1. A process of making alkoxy-substituted carboxylic acid esters by combining ketene with a compound of the group consisting of symmetrical formals and symmetrical acetals which comprises reacting ketene with a liquid compound of the group consisting of symmetrical formals and symmetrical acetals by passing ketene into the compound of the group.

2. A process of making alkoxy-substituted carboxylic acid esters by combining ketene with a compound of the group consisting of symmetrical formals and symmetrical acetals which comprises effecting a reaction between ketene and a compound from the group consisting of symmetrical formals and symmetrical acetals at a temperature between −100 and +100° C.

3. A process of making alkoxy-substituted carboxylic acid esters by combining ketene with a compound of the group consisting of symmetrical formals and symmetrical acetals which comprises preparing a mixture of a compound of the group consisting of symmetrical formals and symmetrical acetals and an acid catalyst and passing ketene into the resulting mixture.

4. A process of making alkoxy-substituted carboxylic acid esters by combining ketene with a compound of the group consisting of symmetrical formals and symmetrical acetals which comprises effecting a reaction between ketene and a compound of the group consisting of symmetrical formals and symmetrical acetals at a temperature between −100 and +100° C. and in the presence of an acid catalyst by passing the ketene into the compound of the group.

5. A process for the preparation of an ether of a beta-hydroxy carboxylic acid ester which comprises reacting ketene with a symmetrical formal in the presence of an acid catalyst.

6. A process for the preparation of an ether of a beta-hydroxy alkyl-substituted propionic acid ester which comprises reacting ketene with a symmetrical acetal higher than formal in the presence of an acid catalyst.

7. A process for the preparation of a beta-methoxy propionate which comprises reacting ketene with a methylal in the presence of an acid catalyst.

8. A process for the preparation of methyl beta-methoxypropionate which comprises passing ketene into methylal containing from 0.2 to 100% of an acid catalyst based on the weight of methylal.

9. A process for the preparation of methyl beta-methoxypropionate which comprises cooling a mixture containing about 2.25 moles of methylal and 0.09 mole of concentrated sulfuric acid to a temperature of about −80° C., introducing about 0.6 mole of ketene into the mixture over a period of about three hours and thereafter recovering the methyl beta-methoxypropionate from the reaction mixture.

10. A process for the preparation of allyl beta-allyloxy-beta-isopropylpropionate which comprises passing ketene into diallyl isobutyral containing a boron fluoride ether complex as the catalyst and recovering the allyl beta-allyloxy-beta-isopropylpropionate from the reaction mixture.

RICHARD ENSIGN BROOKS.

REFERENCES CITED

The following references are of record in the file of this patent:

UNITED STATES PATENTS

| Number | Name | Date |
|---|---|---|
| 2,030,835 | Cox | Feb. 11, 1936 |
| 2,164,188 | Groll | June 27, 1939 |
| 2,197,798 | Gans | Apr. 23, 1940 |
| 2,316,465 | Staudinger | Apr. 13, 1943 |
| 2,366,738 | Loder et al. | Jan. 9, 1945 |
| 2,386,999 | Adelson et al. | Oct. 16, 1945 |
| 2,393,000 | Seeger | Jan. 15, 1946 |

OTHER REFERENCES

Linstead, "Jour. Chem. Soc.," (London 1929), pages 2503, 2509.

Certificate of Correction

Patent No. 2,436,286. February 17, 1948.

RICHARD ENSIGN BROOKS

It is hereby certified that error appears in the printed specification of the above numbered patent requiring correction as follows: Column 4, lines 55 and 56, after the word and period "mixture.", and before the signature of the inventor, insert the following claim:

"11. A process for the preparation of a beta-alkoxy-substituted ester of propionic acid which comprises effecting a reaction between ketene and a symmetrical formal in the presence of an acid catalyst."

in the heading to the printed specification, line 9, for "10 Claims" read *11 Claims*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.*